(12) United States Patent
Yamashita

(10) Patent No.: US 11,463,633 B2
(45) Date of Patent: Oct. 4, 2022

(54) SUBTITLE DATA EDITING METHOD AND SUBTITLE DATA EDITING PROGRAM FOR CONTENTS SUCH AS MOVING IMAGES

(71) Applicant: Akari, Inc., Tokyo (JP)

(72) Inventor: Yosuke Yamashita, Tokyo (JP)

(73) Assignee: Akari, Inc., Tokyo (JP)

( * ) Notice: Subject to any disclaimer, the term of this patent is extended or adjusted under 35 U.S.C. 154(b) by 0 days.

(21) Appl. No.: 17/257,580

(22) PCT Filed: Aug. 16, 2019

(86) PCT No.: PCT/JP2019/032202
§ 371 (c)(1),
(2) Date: Jan. 3, 2021

(87) PCT Pub. No.: WO2021/033225
PCT Pub. Date: Feb. 25, 2021

(65) Prior Publication Data
US 2022/0166941 A1    May 26, 2022

(51) Int. Cl.
*H04N 5/278* (2006.01)
*G11B 27/036* (2006.01)
*H04N 21/845* (2011.01)
*H04N 21/854* (2011.01)

(52) U.S. Cl.
CPC ........... *H04N 5/278* (2013.01); *G11B 27/036* (2013.01); *H04N 21/8456* (2013.01); *H04N 21/854* (2013.01)

(58) Field of Classification Search
None
See application file for complete search history.

(56) References Cited

U.S. PATENT DOCUMENTS

2019/0379943 A1* 12/2019 Ayala ................. G11B 27/34

FOREIGN PATENT DOCUMENTS

| JP | 2010-157961 A | | 7/2010 | | |
|---|---|---|---|---|---|
| JP | 2010157961 A | * | 7/2010 | ............. | H04N 7/173 |
| JP | 2012-142881 A | | 7/2012 | | |
| KR | 102351408 B1 | * | 1/2022 | ........... | H04N 21/488 |

* cited by examiner

*Primary Examiner* — Heather R Jones
(74) *Attorney, Agent, or Firm* — Ogilvie Law Firm

(57) ABSTRACT

The present invention provides a subtitle data editing method that simplifies the work of inputting subtitles to be displayed on contents such as moving images and facilitates quick and efficient editing work. By accepting a predetermined line feed operation twice consecutively in a state wherein a cursor is present in a subtitle input field in which the subtitle content is input, a subtitle input field is separated to be displayed on screen separations before and after the cursor. By accepting a predetermined line feed operation in a state where the cursor exists at the beginning of the second and subsequent lines, the line and the line directly above are separated and the subtitle input field is divided and displayed on screen, when the subtitle input field in which the subtitle content is input is a plurality of lines.

15 Claims, 18 Drawing Sheets

Fig.5
(1)
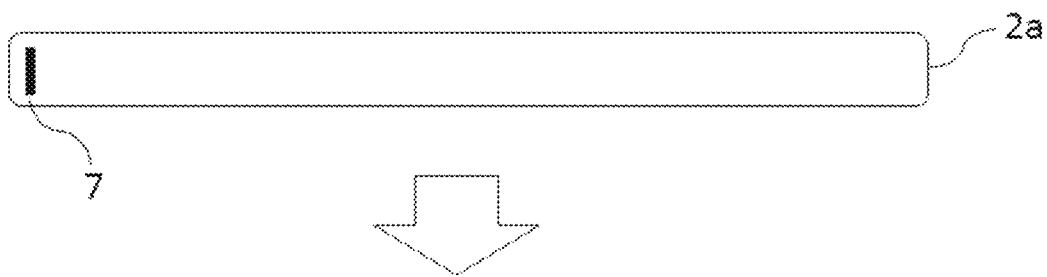
(2)
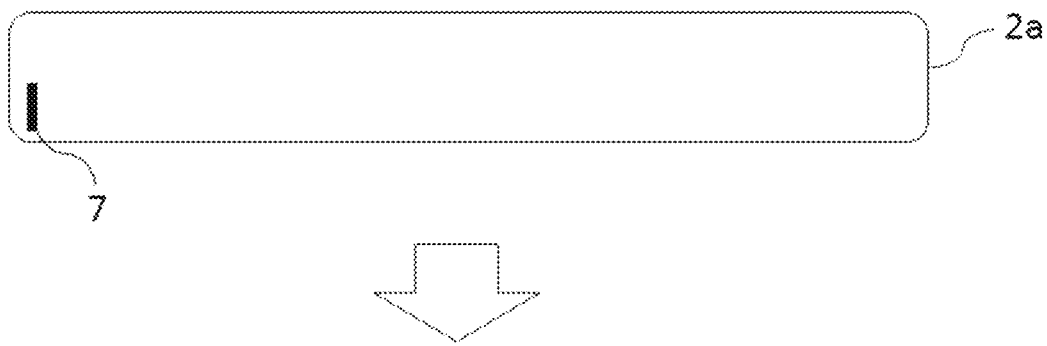
(3)
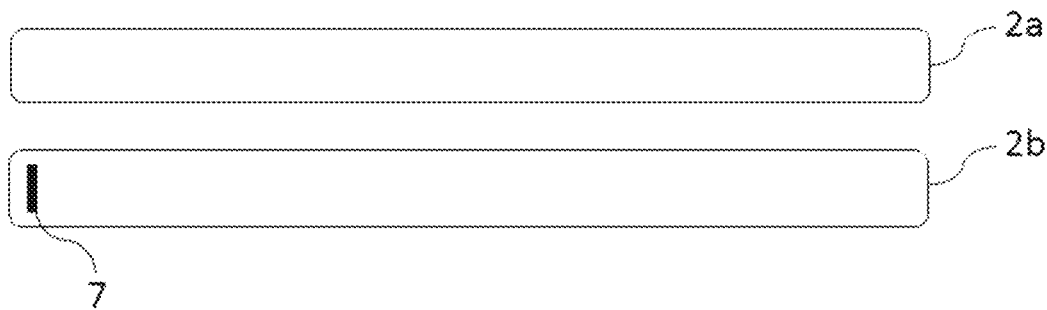

Fig.6
(1)
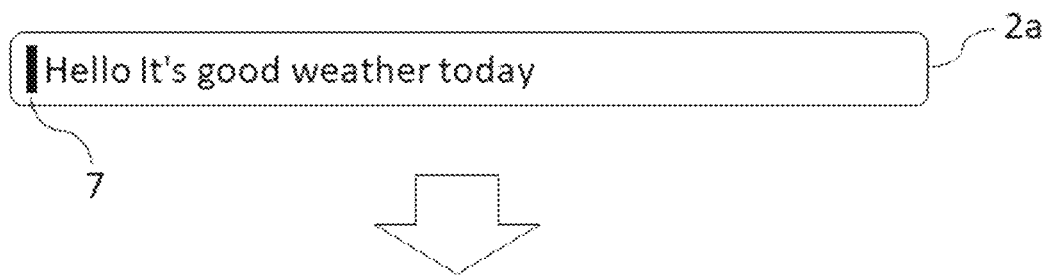
(2)
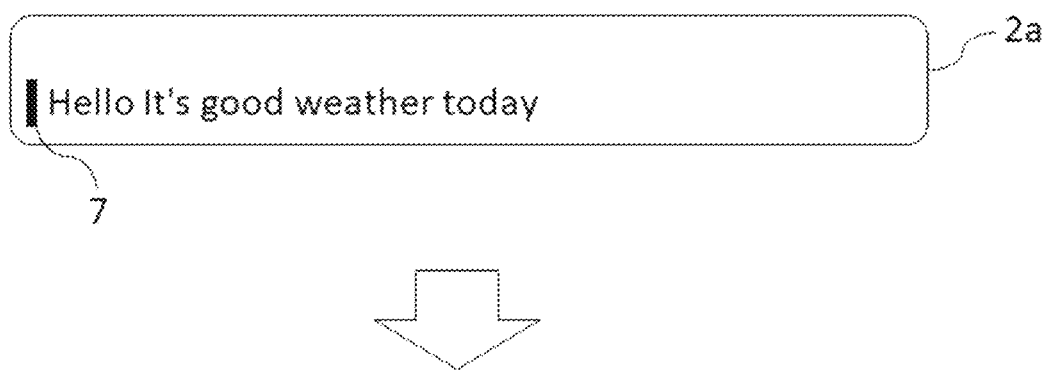
(3)
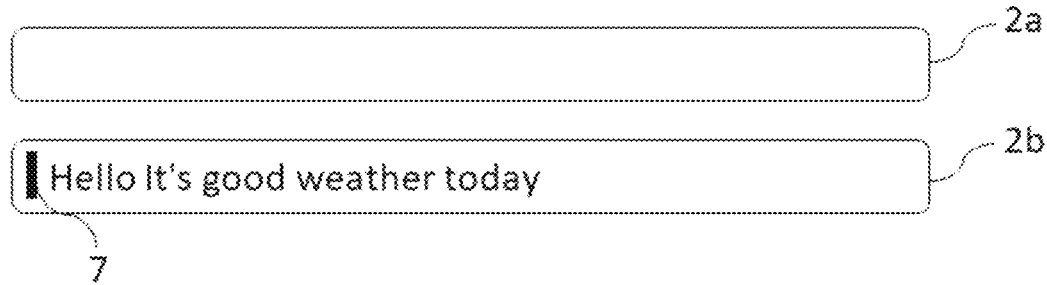

Fig.7
(1)
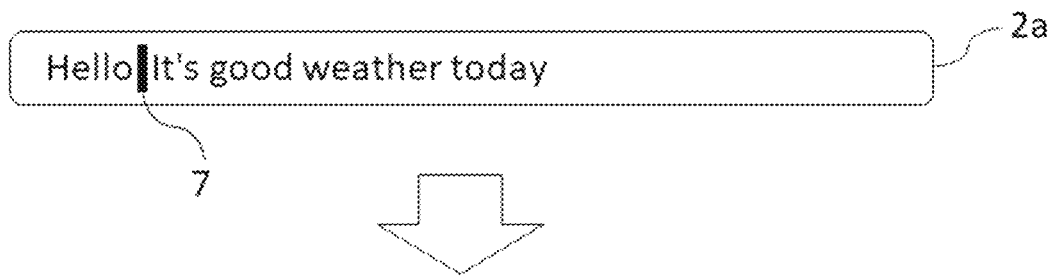
(2)
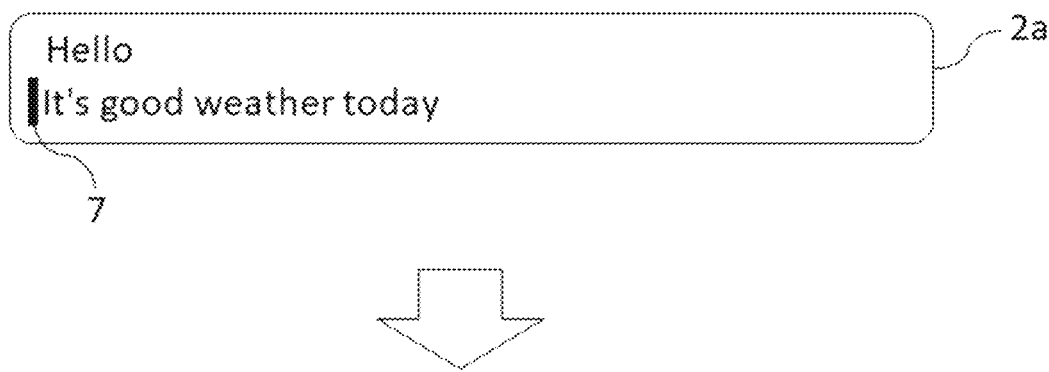
(3)
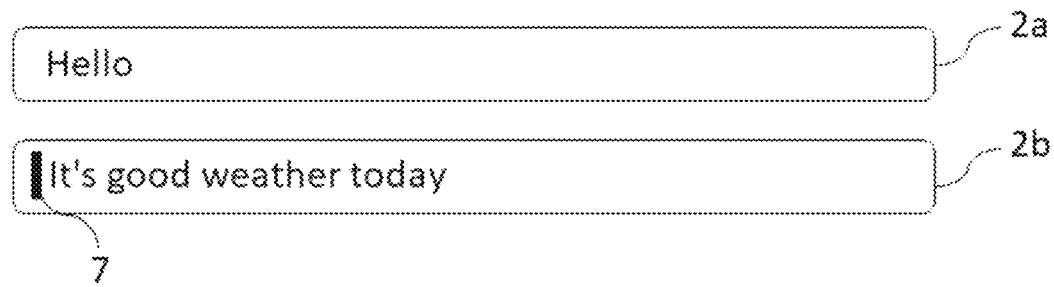

Fig.8
(1)
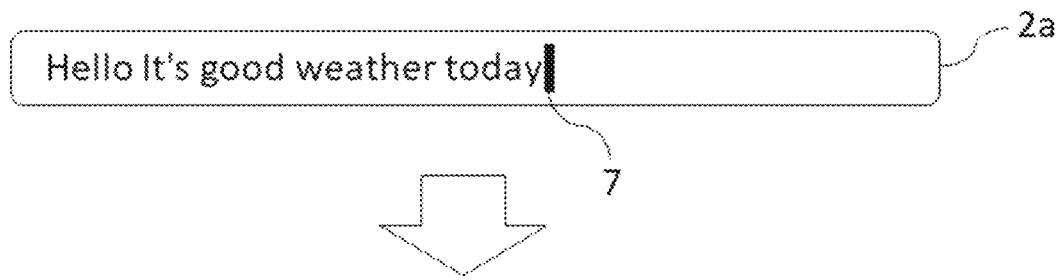
(2)
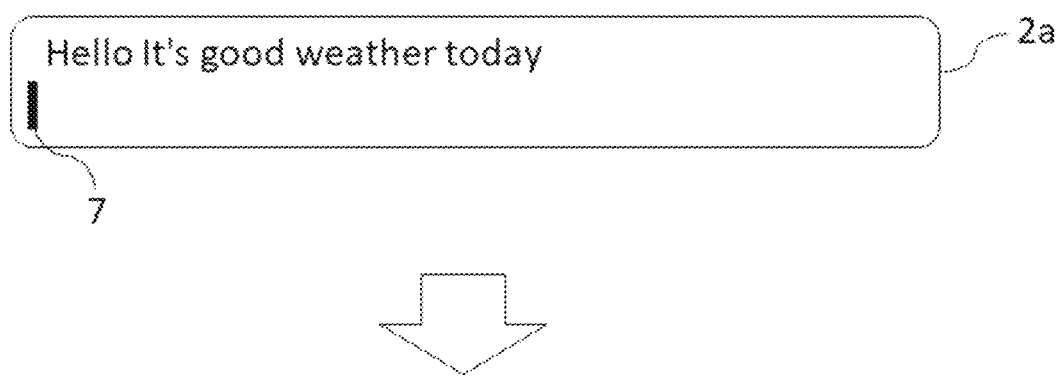
(3)
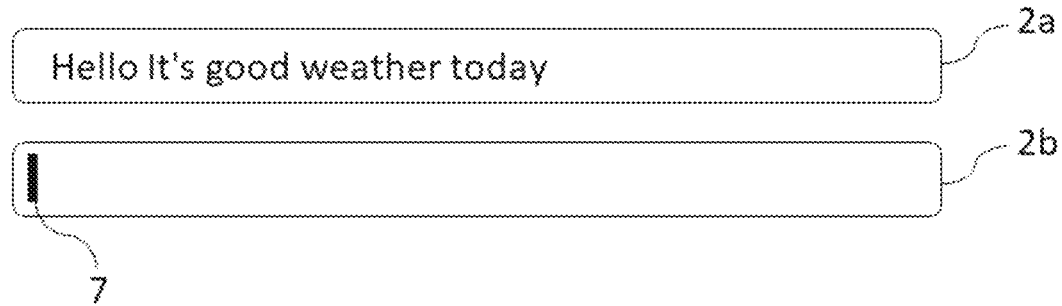

Fig.10
(1)
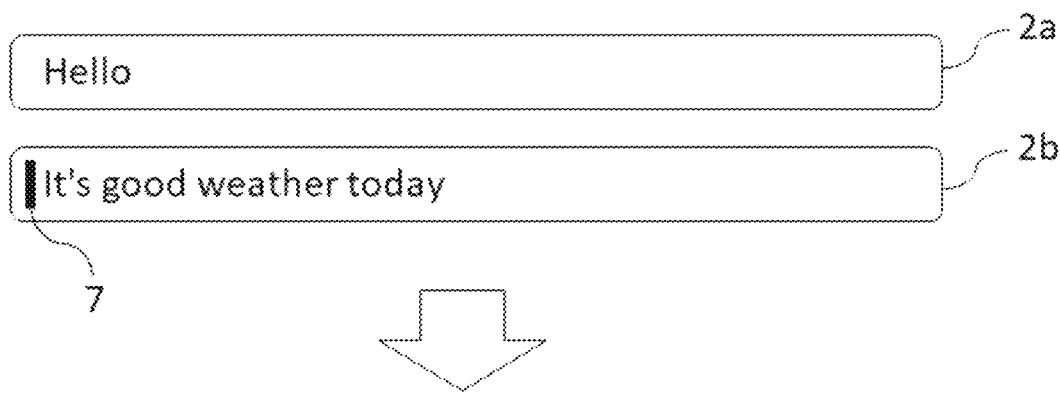
(2)
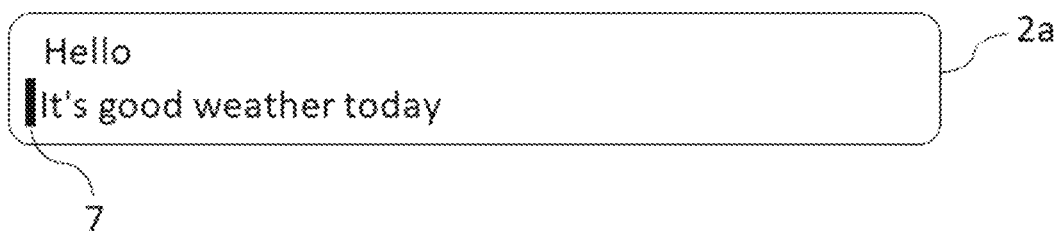

Fig.12
(1)
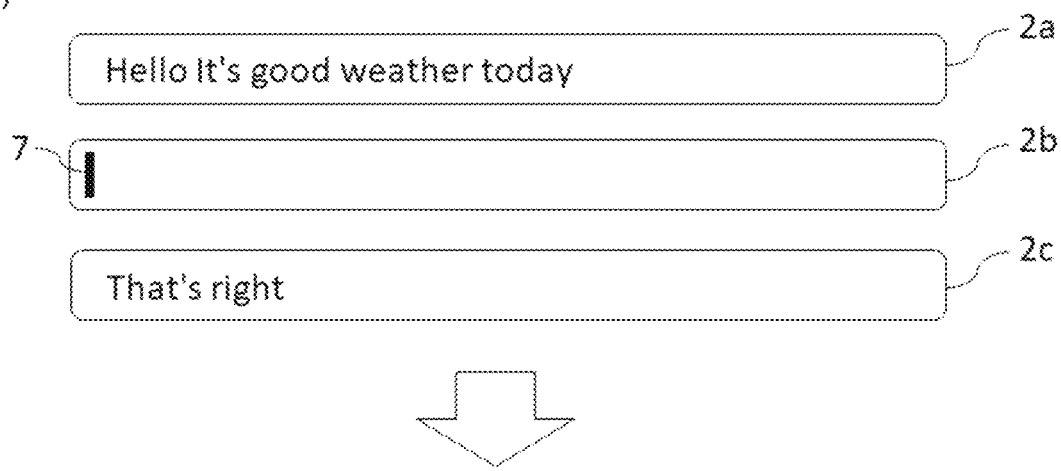
(2)
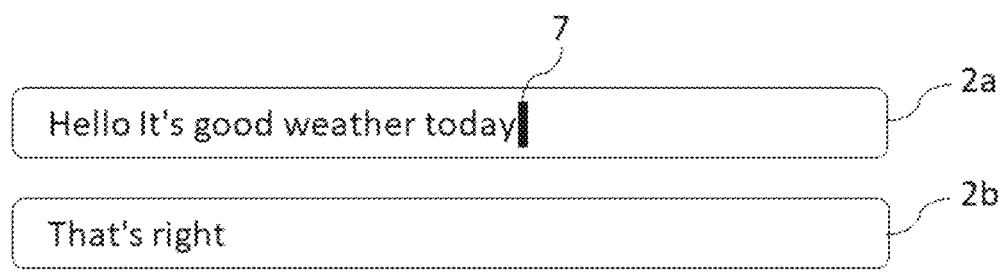

Fig.14
(1)
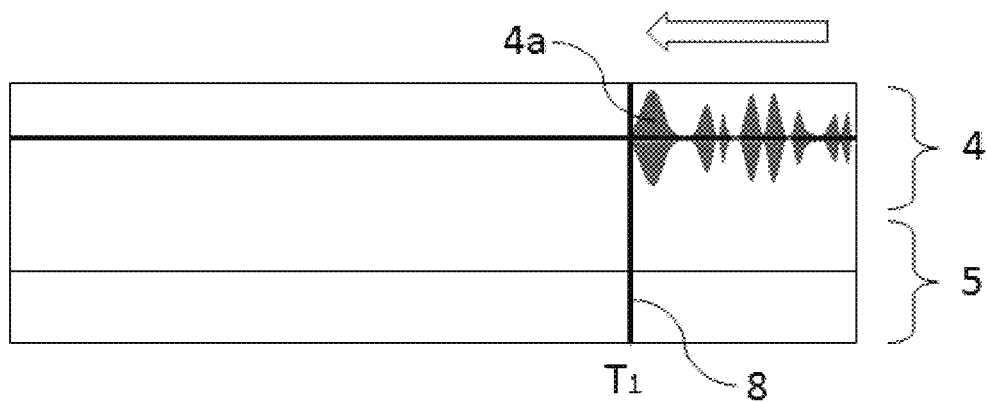
(2)
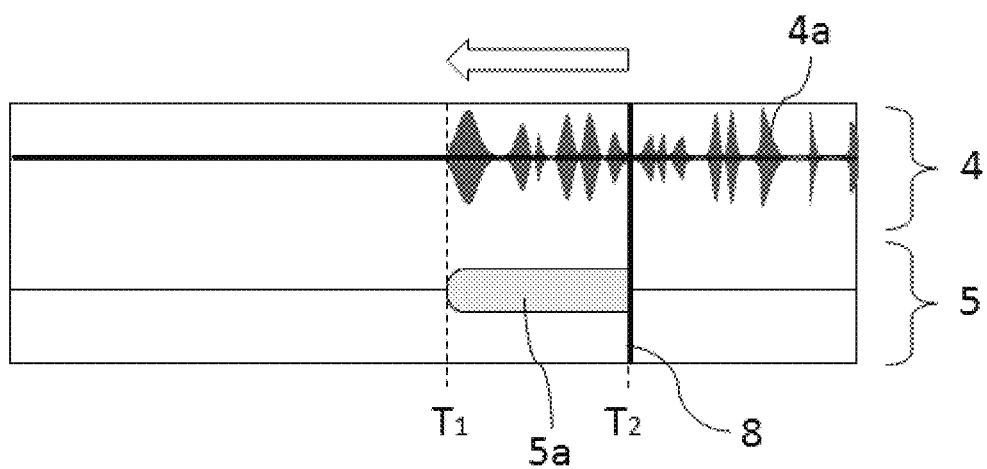
(3)
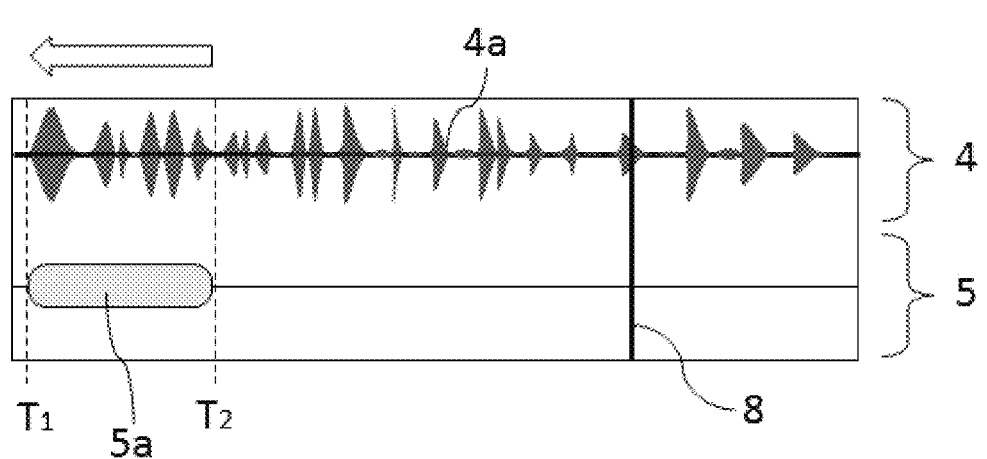

Fig.18
(1)
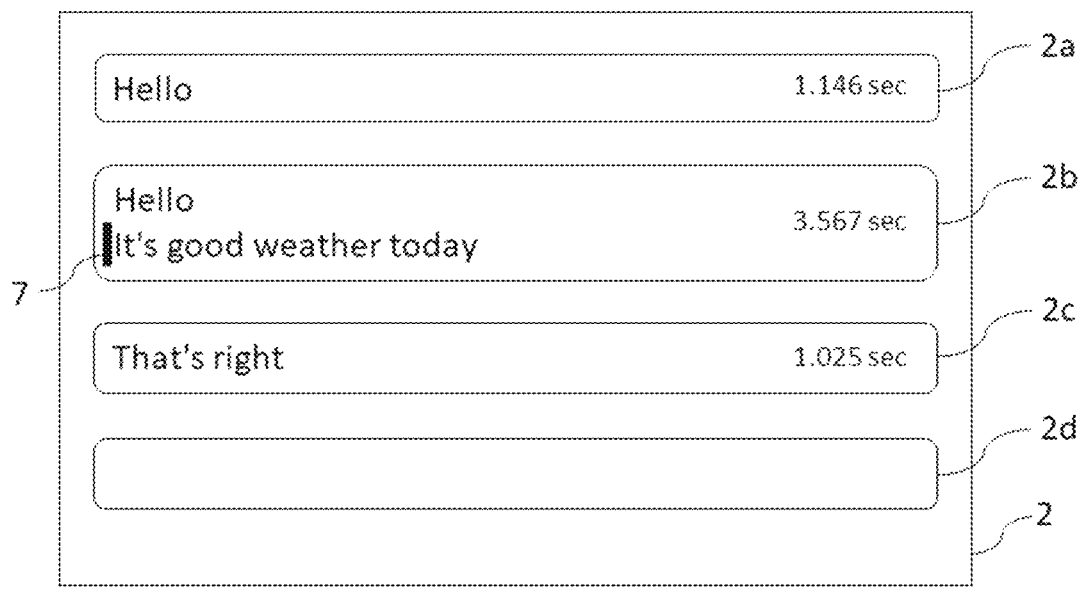
(2)
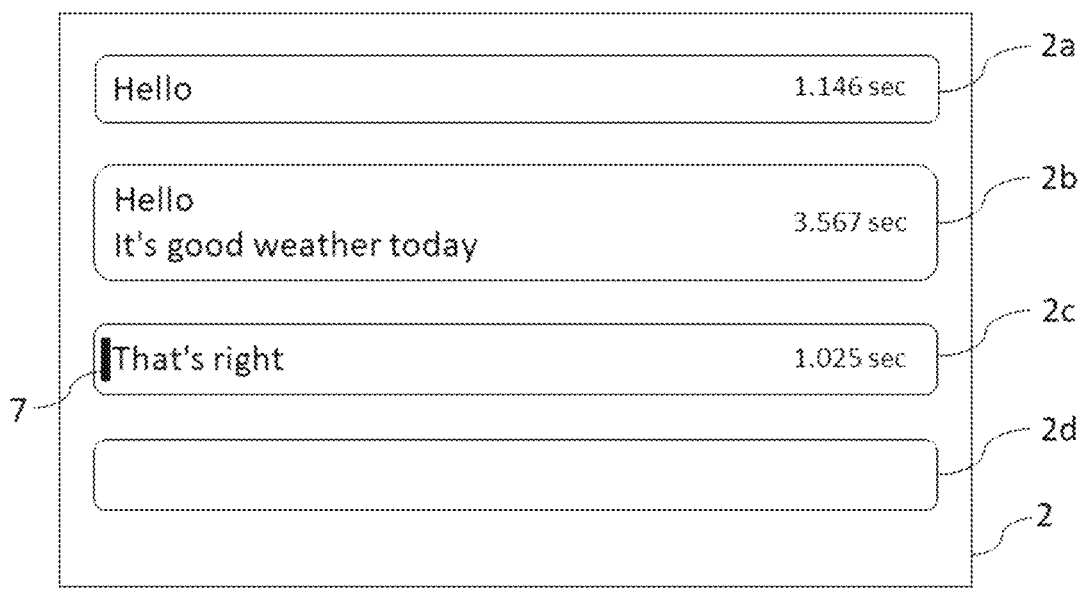

SUBTITLE DATA EDITING METHOD AND SUBTITLE DATA EDITING PROGRAM FOR CONTENTS SUCH AS MOVING IMAGES

RELATED APPLICATIONS

The present application claims priority to, and incorporates by reference the entirety of, PCT application no. PCT/JP2019/032202 filed 16 Aug. 2019.

TECHNICAL FIELD

The present invention relates to an editing technique and an editing program of subtitling to be displayed in video contents and such.

BACKGROUND ART

Conventionally, subtitles and telops have been displayed in video contents such as movies and televisions. In recent years, with the development of information and communication technology, anyone can easily upload video contents on the Web and share the video contents with many users. When uploading video contents, the video contents are often made more attractive by adding subtitles and sound effects to attract the interest of other users.

However, editing video content is complicated and takes too much time and effort. For example, when trying to display subtitles in a moving image content in which two performers talk, it is necessary to accurately display the subtitles in accordance with the video and audio. And, when the speaker is switched, it is preferable to switch the subtitles to be displayed, but if the display setting work is separately performed not only for inputting the subtitles but also for such display switching, then the editing work is made more complicated, which is a problem.

In accordance with this situation, a subtitle editing method for facilitating the subtitle editing work is known (refer to Patent Document 1). This makes the editing work easier by visually displaying the connection between the subtitles and the frame image corresponding to the subtitles in an easy-to-understand manner. However, the subtitle editing method disclosed in Patent Document 1 is to facilitate the handling of each subtitle constituent unit on the premise that the subtitle input work is already completed; while making the handling of subtitle constituent unit itself easy, this is not something that makes the subtitle input work itself easy, leaving the problem as it is.

PRIOR ART

Patent Literature

[Patent literature 1] JP2012-142881A

OUTLINE OF THE INVENTION

Problems to be Solved by the Invention

In general, when displaying subtitles on a moving image, blank lines are often not used. By considering the customary elements in such subtitle display, it can be said that the complicated editing work can be performed with simpler operations.

In view of such a situation, an object of the present invention is to provide a subtitle data editing method and a subtitle data editing program that simplify the work of inputting subtitles to be displayed on contents such as moving images, and facilitate quick and efficient editing work.

Means to Solve the Objects

In order to solve the above problems, a subtitle data editing method of a first aspect of the present invention is a method of editing subtitle data having the subtitle time and the subtitle content of a content such as a moving image. By accepting a predetermined line feed operation twice consecutively in a state wherein a cursor is present in a subtitle input field into which the subtitle content is input, a subtitle input field is separated and displayed on a screen after separation before and after the cursor is present.

For example, if the subtitle content is entered in the subtitle input field and the cursor is in the sentence, the subtitle input field is divided, and if the cursor is at the beginning of the sentence, a new subtitle input field is made in an upper row. Further, if the cursor is at the end of the sentence, a new subtitle input field is created at a lower column. As a user, the subtitle input field can be divided or newly created based on the cursor position simply by performing a predetermined line feed operation twice in succession, so that a complicated editing work can be performed quickly and efficiently by a simple command input.

Herein, the "content such as a moving image" includes not only moving image content such as a movie or a television but also content in which still images are switched. Further, the subtitle time means the subtitle display start time and the subtitle display end time, and also includes the display time from the subtitle display start time and the time duration from the subtitle display start time.

A subtitle data editing method of a second aspect of the present invention is a method of editing subtitle data having the subtitle time and the subtitle content of a content such as a moving image. By accepting a predetermined line feed operation in a state where the cursor exists at the beginning of the second and subsequent lines, the line and the line directly above are separated and the subtitle input field is divided and displayed on the screen, when the subtitle input field in which the subtitle content is input is a plurality of lines.

If both the line where the cursor exists and the line directly above the line where the cursor exists are lines where the text is input, the subtitle input field is to be divided. However, if the line directly above the line where cursor exists is a blank line, a new subtitle input field is created in the upper row, and if the line where the cursor exists is a blank line, a new subtitle input field is created in the lower row. It suffices if there are multiple lines in the subtitle input field where the subtitle content is input, and unlike the subtitle data editing method from the first aspect, it is not always necessary to accept a predetermined line feed operation twice successively. Wide and complicated editing work can be performed by a simple command input with ease.

The predetermined line feed operation in the subtitle data editing method of the first or second aspect of the present invention may be input by a mouse or voice, but is preferably input by a line feed key. By inputting the predetermined line feed operation in the subtitle data editing method of the first aspect of the present invention using the line feed key, it becomes possible to perform a complicated editing work such as dividing the subtitle input field or creating a new subtle input field by simply inputting the line feed key twice in succession. Further, since the line feed key is generally used for the line feed operation in text input, the line feed key input operation is performed as a predetermined line feed operation of the subtitle data editing method according to the second aspect of the present invention, following the operation. This makes it possible to perform a complicated edit, such as dividing the subtitle input field or creating a new one, with a simple operation.

For example, if the subtitle input field is one line and blank, and the cursor is in the subtitle input field, you can simply enter the line feed key twice in a row to enter a blank subtitle in the upper row of the subtitle input field to create a new input field. When the cursor is at the beginning of the sentence of the subtitle input field, a blank subtitle input field can be newly created in the upper row of the subtitle input field simply by inputting the line feed key twice in succession. If the cursor is in the text of the subtitle input field, the subtitle input field can be divided by simply inputting the line feed key twice in succession. If the cursor is at the end of the sentence of the subtitle input field, a blank subtitle input field can be newly created at the bottom of the subtitle input field simply by inputting the line feed key twice in succession.

In the subtitle data editing method of the first or second aspect of the present invention, when there are a plurality of subtitle input fields, by accepting a predetermined combining operation when the cursor is in the second subtitle input field and thereafter accepting a predetermined combination operation, the subtitle input field in which the cursor exists and the subtitle input field directly above the subtitle field are preferably combined to be displayed as one subtitle input field.

As a result, as a user, by adjusting the position of the cursor and performing a predetermined combination operation, it becomes possible to perform a complicated edit combining subtitle input fields by a simple command input. Combining the subtitle input fields means that when text is input in both the subtitle input field where the cursor is located and the subtitle input field directly above, the subtitle input field and the subtitle input field directly above are input as one subtitle, forming a column.

In the subtitle data editing method of the first or second aspect of the present invention, when there are a plurality of subtitle input fields and there are blank subtitle input fields in the second and subsequent subtitle input fields, when the cursor lies at the head of a blank subtitle input field or a blank subtitle input field immediately below the blank subtitle input field, it is preferable to delete the blank subtitle input field from the screen by accepting a predetermined deletion operation while the cursor lies at the beginning of any of the fields.

As a result, the user can perform a complicated edit deleting the subtitle input field by simply inputting a command by adjusting the position of the cursor and performing a predetermined deletion operation. Note that "deleting the subtitle input field" means that the subtitle input field itself disappears when no text is input in the subtitle input field where the cursor exists, or the subtitle input field directly above the subtitle input field where the cursor exists.

In the subtitle data editing method according to the first or second aspect of the present invention, the subtitle input field alternately receives a predetermined subtitle start operation and a predetermined subtitle end operation during playback of the content to be edited. The playback time when the predetermined subtitle start operation is accepted is set as the subtitle display start time, the playback time when the predetermined subtitle end operation is accepted is set as the subtitle display end time, and the subtitle display end time is set from the set subtitle display start time. It is preferable to set up the subtitle time and generate a subtitle input field for inputting the subtitle content and displaying it on the screen.

If the user wants to create one subtitle input field, the subtitle start operation and the subtitle end operation may be performed once each, and if there are two subtitle input fields to be created, the subtitle start operation and the subtitle start operation may be performed. It suffices to perform the subtitle end operation alternately twice. In this way, the subtitle display start time, subtitle display end time, and subtitle time can be set collectively by a simple operation of alternately performing specific operations, and complicated editing work can be easily completed. As the subtitle start operation or subtitle end operation, keyboard shortcut keys are preferably assigned, and more preferably, keyboard shortcut keys located at close positions are assigned. Operation is not limited to shortcut keys; input operations using a mouse or voice may be used.

In the subtitle data editing method of the first or second aspect of the present invention, when there is a plurality of subtitle input fields, it is preferable to move the cursor in the adjacent subtitle input fields by accepting a predetermined direction input operation.

The user can move the cursor in the subtitle input field by a direction input operation such as inputting a direction key, but for the movement between the subtitle input fields, the subtitle input field may be selected by inputting a tab key or the like. It is common to switch, but according to the present invention, the cursor can be moved into the adjacent subtitle input field by a direction input operation such as a direction key input, so that the subtitle input field can be switched by a simple operation.

A subtitle data editing method of a third aspect of the present invention is a method of editing subtitle data having the subtitle time and the subtitle content of a content such as a moving image, when there is a plurality of subtitle input fields for inputting subtitle contents. A subtitle input field in which a cursor exists and a subtitle field directly above it are combined to be displayed on the screen by accepting the predetermined combining operation with the cursor at the head of the second and the subsequent subtitle input field. When a blank subtitle input field exists in the second and subsequent subtitle input fields, the blank subtitle input field is deleted from the screen by accepting a predetermined deletion operation when the cursor is at the head of either a blank subtitle input field or a subtitle input field directly therebelow.

In the subtitle data editing method of the third aspect of the present invention, the subtitle input field, by alternately accepting the predetermined subtitle start operation and the predetermined subtitle end operation during the playback of the content to be edited, sets the playback time when the predetermined subtitle start operation is accepted as the subtitle display start time and sets the play back time when the predetermined subtitle end operation is accepted as the subtitle display end time, and further sets the time from subtitle display start time to subtitle display end time as the subtitle time and preferably generates a subtitle input field for inputting the subtitle content to be displayed on the screen.

When there are a plurality of subtitle input fields for inputting subtitle contents, the subtitle data editing method of the third aspect of the present invention is preferable to move the cursor in the adjacent subtitle input fields by accepting a predetermined direction input operation.

The subtitle data editing program of the first aspect of the present invention is a program of editing subtitle data having the subtitle time and the subtitle content of a content such as a moving image, and the program causes a computer to execute the following steps A-1) to A-4).

A-1) A step to display the subtitle input field where the subtitle content is input on the screen.
A-2) A step to display the cursor in the subtitle input field.
A-3) A step of accepting a predetermined line feed operation twice in succession.
A-4) A step of separation before and after the cursor, dividing the subtitle input field, and displaying it on the screen.

The subtitle data editing program of the second aspect of the present invention is a program of editing subtitle data having the subtitle time and the subtitle content of a content such as a moving image, and the program causes a computer to execute the following steps B-1) to B-5).

B-1) A step to display the subtitle input field where the subtitle content is input on the screen.
B-2) A step to display the subtitle contents of multiple lines in the subtitle input field.
B-3) A step of displaying the cursor at the beginning of the second and subsequent lines, in the subtitle input field,
B-4) A step of accepting a predetermined line feed operation.
B-5) A step of separating the line where the cursor is and the line directly above it, dividing the subtitle input field, and displaying it on the screen.

The subtitle data editing program of the third aspect of the present invention is a program of editing subtitle data having the subtitle time and the subtitle content of a content such as a moving image, and the program causes a computer to execute the following steps C-1) to C-4).

C-1) A step of displaying a plurality of subtitle input fields on the screen for entering subtitle content.
C-2) A step of displaying the cursor at the beginning of the second and subsequent subtitle input fields.
C-3) A step of accepting a predetermined joining operation.
C-4) A step of combining the subtitle input field where the cursor is and the subtitle input field directly above it as one subtitle input field and displaying it on the screen.

The subtitle data editing program of the fourth aspect of the present invention is a program of editing subtitle data having the subtitle time and the subtitle content of a content such as a moving image, and the program causes a computer to execute the following steps D-1) to D-4).

D-1) A step of displaying multiple subtitle input fields for entering subtitle content on the screen.
D-2) A step in which any of the second and subsequent subtitle input fields are left blank and the cursor is displayed at the beginning of either the blank subtitle input field or the subtitle input field directly below the blank subtitle input field.
D-3) A step of accepting a predetermined deletion operation.
D-4) A step of deleting the subtitle input field where the cursor exists from the screen.

The subtitle data editing program of the fifth aspect of the present invention is a program of editing subtitle data having the subtitle time and the subtitle content of a content such as a moving image, and the program causes a computer to execute the following steps E-1) to E-5).

E-1) A step to playback the content to be edited.
E-2) A step to alternately accept a predetermined subtitle start operation and a predetermined subtitle end operation.
E-3) A step of setting the playback time when a predetermined subtitle start operation is received as the subtitle display start time.
E-4) A step of setting the playback time when a predetermined subtitle end operation is accepted as the subtitle display end time.
E-5) A step of generating a subtitle input field for inputting subtitle contents to be displayed on the screen by regarding the time from the subtitle display start time to the subtitle display end time as the subtitle time.

Effects of the Invention

According to the subtitle data editing method and the subtitle data editing program for content such as moving images of the present invention, there is an effect that the input work of subtitles to be displayed on a content such as a moving image is simplified, and quick and efficient editing is facilitated.

BRIEF DESCRIPTION OF THE DRAWINGS

FIG. 5 shows an image diagram of a subtitle input field when no character is input.
FIG. 6 shows an image diagram of a subtitle input field when a cursor is at the beginning of the sentences.
FIG. 7 shows an image diagram of a subtitle input field when a cursor is in sentences.
FIG. 8 shows an image diagram of a subtitle input field when a cursor is at the end of sentences.
FIG. 10 shows a combined image diagram of a subtitle input field.
FIG. 12 shows a deletion image diagram of a blank subtitle input field.
FIG. 14 shows an image diagram of an audio waveform display unit and a subtitle time setting unit.
FIG. 18 shows an image diagram of moving a cursor in a subtitle input field.

BEST MODE FOR CARRYING OUT THE INVENTION

Embodiments of the present invention will be described in detail below with reference to the drawings. The present invention is not limited to the following embodiments and examples shown in the figures, and the present invention can be variously changed in design.

Embodiment 1

Figure 1:
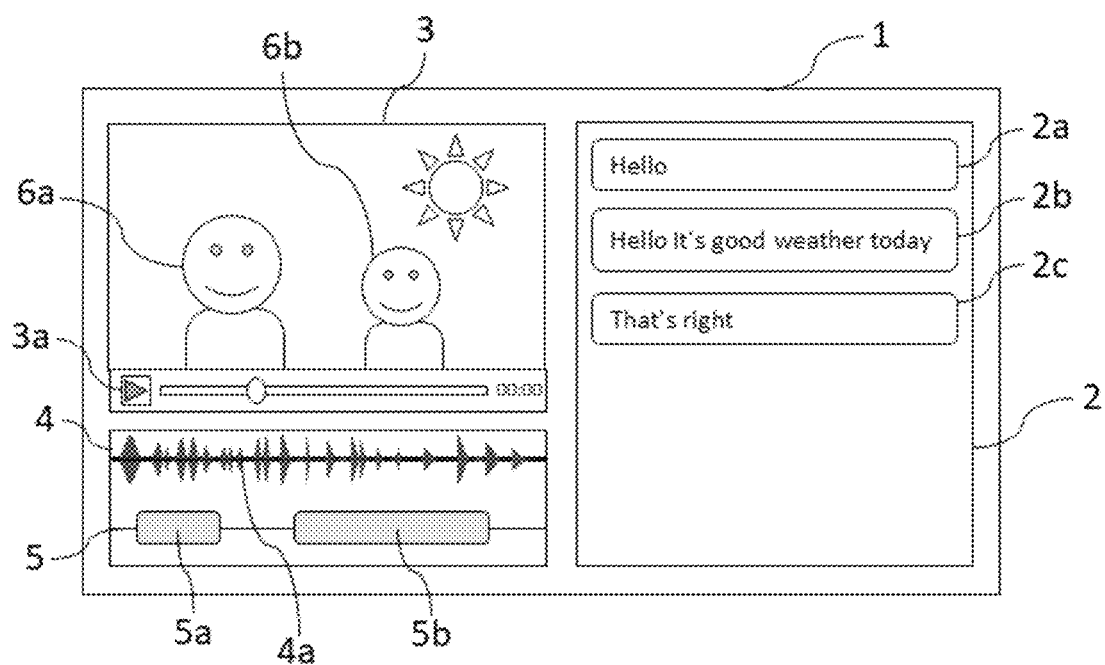
FIG. 1 shows an image diagram of a whole operation screen.

FIG. 1 shows an image diagram of a whole operation screen. As shown in FIG. 1, on the operation screen 1 of the PC (not shown) used by the user (not shown), a subtitle input unit 2, a moving image display unit 3, an audio waveform display unit 4, and a subtitle time setting unit 5 are displayed. The moving image display unit 3 is provided with a moving image play/stop button 3a and a button for changing the playing time, and although not shown, a full-screen display or the like is also possible. An image of the performers (6a, 6b) is displayed on the moving image display unit 3.

Subtitle input fields (2a~2c) are displayed in the subtitle input unit 2. In this configuration, the user inputs texts to be displayed as subtitles while watching a video projected on the moving image display unit 3.

The audio waveform 4a is displayed on the audio waveform display unit 4, and the subtitle display time data (5a, 5b) is displayed on the subtitle time setting unit 5. The subtitle display time data 5a is the time for displaying the text entered in the subtitle input field 2a on the moving image, namely, the subtitle time is displayed in the form of a graph, and the subtitle display start time and the subtitle display end time can be set by using a predetermined shortcut key. Similarly, the subtitle display time data 5b indicates the time for displaying the text input in the subtitle input field 2b on the moving image.

Further, although exposition is omitted in this specification, operations such as adding a track, switching between valid/invalid, switching before and after a track, erasing, and saving a track can be performed on the operation screen 1, and operations such as addition and saving from a menu column (not shown) are also possible. Moreover, settings can be changed and help can be referenced. Further, the display size of the audio waveform display unit 4 and the subtitle time setting unit 5 can be changed.

Figure 2:
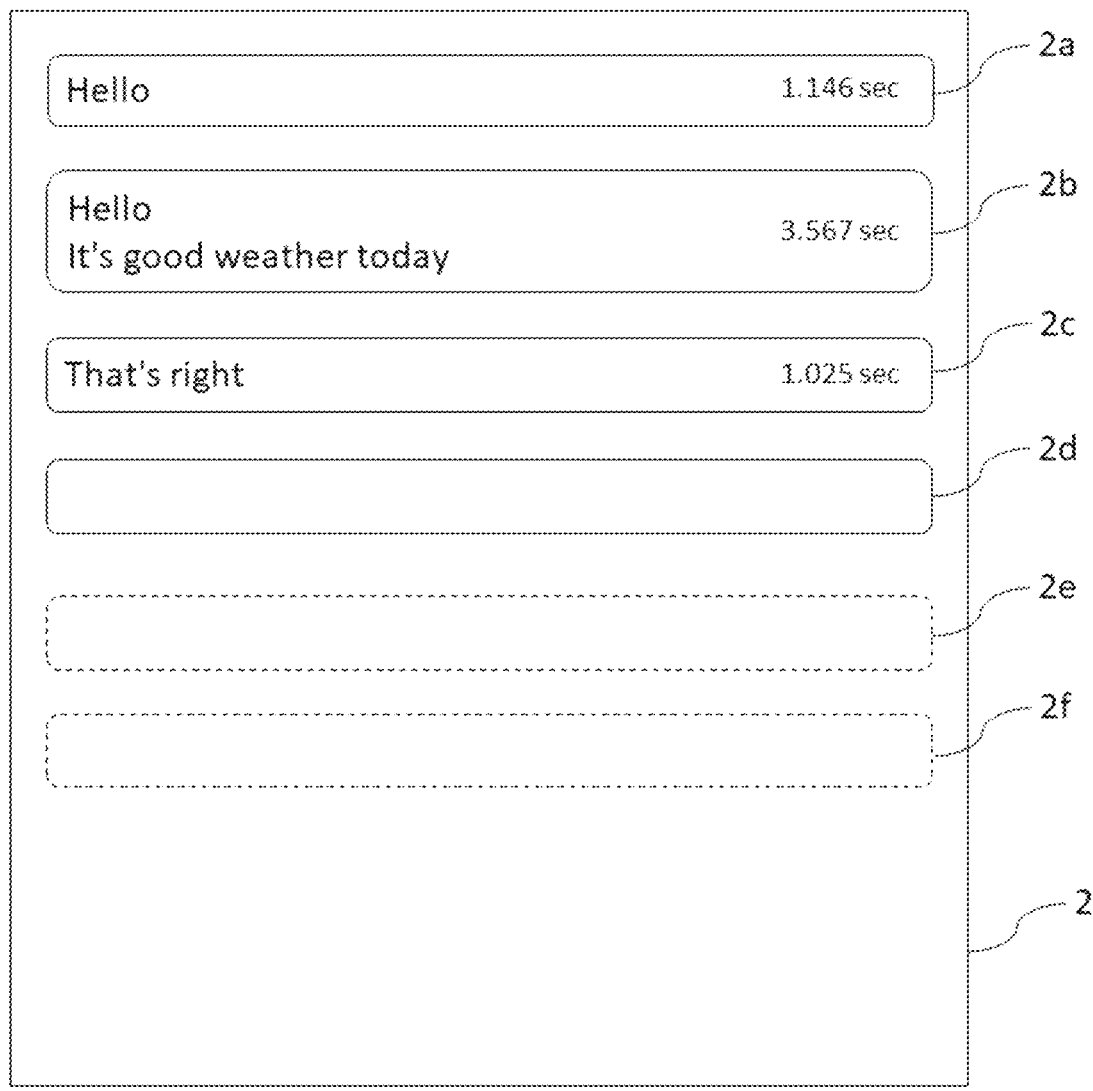
FIG. 2 shows an image diagram of a subtitle input unit of Embodiment 1.

FIG. 2 shows an image diagram of the subtitle input unit of Embodiment 1. As shown in FIG. 2, the "Hello" is entered in the subtitle input field 2a and the "Hello It's good weather today" is entered in the subtitle input field 2b and also "That's right" is entered in the subtitle input field 2c. On the other hand, the subtitle input field 2d is blank. In this way, it is also possible to temporarily set a blank subtitle in which no text is input and then input a sentence later. Here, in the subtitle input field, punctuation marks are not used, and "punctuation marks" are "full-width spaces" and "reading points" are "half-width spaces" according to a general example in subtitle editing. Further, in the present specification, "blank" means that there is no input. Although only four subtitle input fields are used here, the number can be increased as needed, as in the subtitle input fields (2e, 2f).

In addition, the display time of each text on the moving image is displayed at the right end of the subtitle input field (2a~2c). Specifically, it can be seen that the subtitle input field 2a is displayed for 1.146 seconds, the subtitle input field 2b is displayed for 3.567 seconds, and the subtitle input field 2c is displayed for 1.025 seconds.

Figure 3:
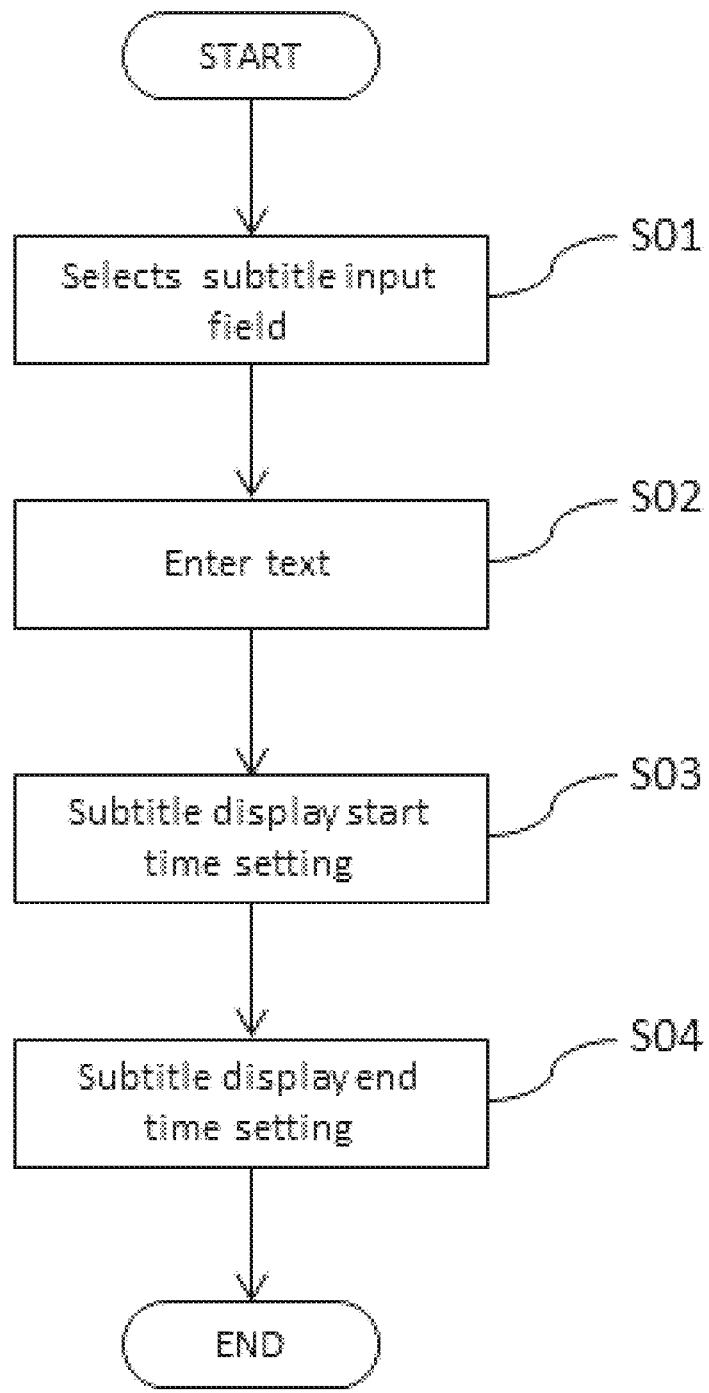
FIG. 3 shows a schematic flow chart of a subtitle data editing method of Embodiment 1.

Next, a subtitle data editing method will be described. FIG. 3 shows a schematic flow chart of the subtitle data editing method of Embodiment 1. As shown in FIG. 3, the user first selects the subtitle input field provided in the subtitle input unit 2 (step S01). If the subtitle has not been input yet, for example, the subtitle input field 2a is selected. Enter text in the selected subtitle input field (step S02). After that, the time to start displaying the input text is set (step S03). In addition, the time for ending the display of the input text is set (step S04). Either the subtitle display start time setting in step S03 or the subtitle display end time setting in step S04 may be performed first. Further, as will be described later, the text may be input or modified after the subtitle display start time and the subtitle display end time are set.

Figure 4:
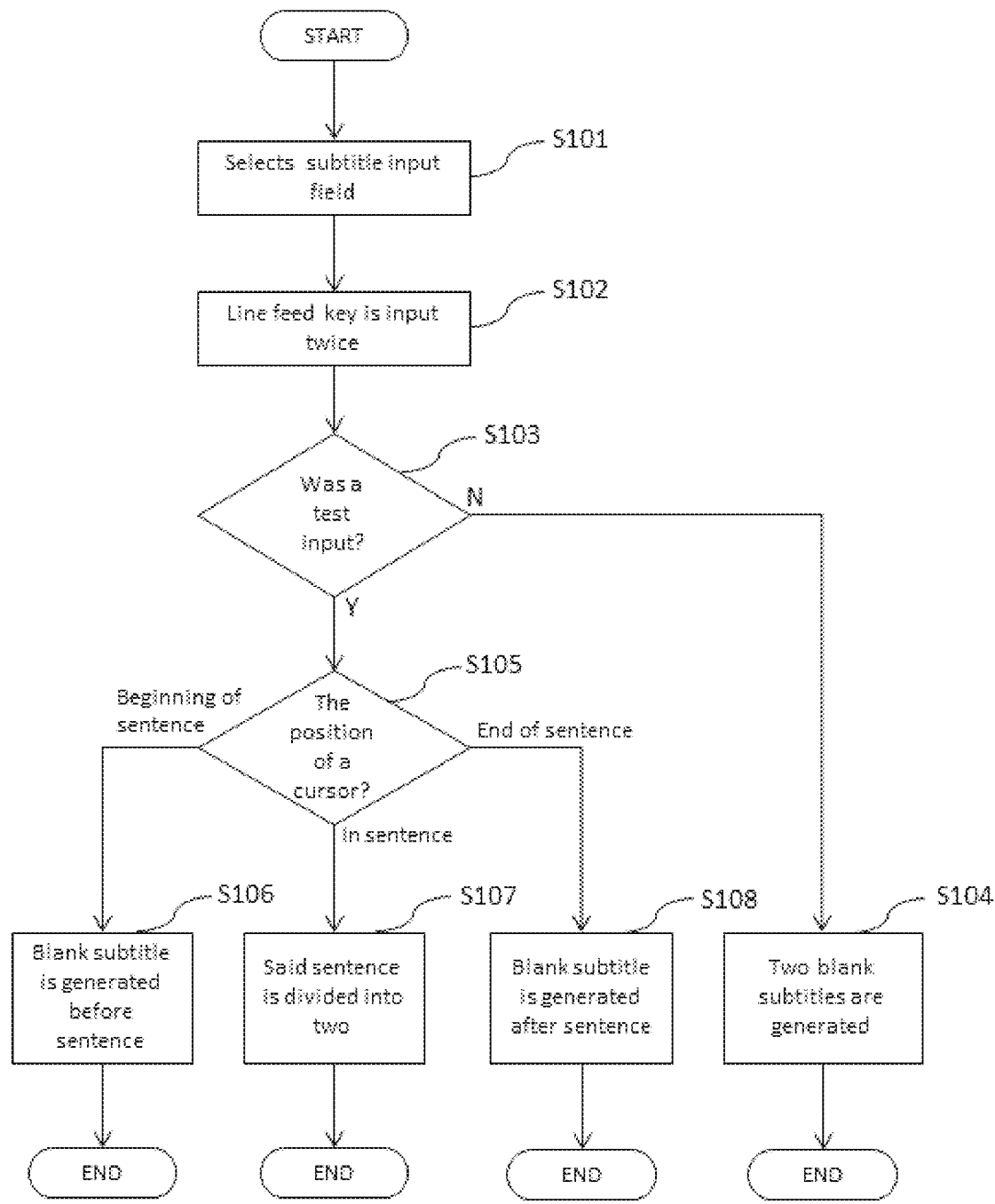
FIG. 4 shows a split flow diagram of a subtitle input field of Embodiment 1.

FIG. 4 shows a split flow diagram of the subtitle input field of Embodiment 1. As shown in FIG. 4, first, the subtitle input field provided in the subtitle input unit 2 is selected (step S101). Here, the line feed key is input twice (step S102). When no character is input in the selected subtitle input field (step S103), a blank subtitle input field is generated after the selected subtitle input field, and as a result, two blank subtitles are generated. (Step S104). In this embodiment, the line feed key is input as the line feed operation, but it may be input by a mouse or voice.

FIG. 5 is an image diagram of the subtitle input field when no character is input, (1) represents the case when the subtitle input field is selected, (2) represents the case when the line feed key is input once, and (3) represents the case when the line feed key is input twice. As shown in FIG. 5 (1), the cursor 7 is placed in the subtitle input field 2a in a blank state. Therefore, when the line feed key is input once, the entire sentence is broken and the upper and lower rows become blank, as shown in FIG. 5 (2). If the line feed key is entered again in this state, the subtitle input field 2a becomes two: a blank subtitle input field 2a and a blank subtitle input field 2b, and as a result, two blank subtitles are generated.

On the other hand, when characters are input in the selected subtitle input field (step S103), the result differs depending on the position of the cursor before the line feed key is input twice (step S105). Namely, if the cursor position is at the beginning of the sentence before the line feed key is input twice, a blank subtitle is generated before the sentence (step S106).

FIG. 6 is an image diagram of the subtitle input field when the cursor is at the beginning of the sentence, (1) represents the case when the subtitle input field is selected, (2) represents the case when the line feed key is input once, and (3) represents the case when the line feed key is input twice. As shown in FIG. 6 (1), in the subtitle input field 2a, a sentence "Hello It's good weather today." is input. In addition, the cursor 7 is placed at the beginning of a sentence "Hello It's good weather today." Therefore, when the line feed key is input once, the entire sentence is broken and the upper row becomes blank, as shown in FIG. 6 (2). When the line feed key is input again in this state, the subtitle input field 2a becomes two, a blank subtitle input field 2a and a subtitle input field 2b in which the said text is input, resulting in a state wherein a blank subtitle is generated before the sentence.

If the cursor position is in the sentence before the line feed key is input twice, said sentence is divided into two at the cursor position, and a subtitle input field for each sentence is generated (step S107).

FIG. 7 is an image diagram of the subtitle input field when the cursor is in the sentence, (1) is when the subtitle input field is selected, (2) is when the line feed key is input once, and (3) is when the line feed key is input twice. As is shown in FIG. 7 (1), the subtitle input field 2a is input with a sentence "Hello It's good weather today.". In addition, the cursor 7 is placed between the sentence parts "Hello" and "It's good weather today." Therefore, when the line feed key is input once, as shown in FIG. 7 (2), the part of the sentence "It's fine weather today" is broken at the position of the cursor 7. When the return key is entered one more time, the subtitle input column 2a is divided into two, one being "Hello" and the input subtitle input field 2a and another being "It's a fine day today" and the input field 2b at the position of the cursor 7, as shown in FIG. 7 (3).

If the cursor position is at the end of the sentence before the line feed key is input twice, a blank subtitle is generated after the sentence (step S108).

FIG. 8 is an image diagram of the subtitle input field when the cursor is at the end of the sentence, (1) showing a time when the subtitle input field is selected, (2) showing a time when the line feed key is input once, and (3) showing a time when the line feed key is input twice. As shown in FIG. 8 (1), in the subtitle input field 2a, a sentence "Hello It's good weather today." is input. In addition, the cursor 7 is placed at the end of the sentence "Hello It's good weather today.". Therefore, when the line feed key is input once, a line feed is performed and the lower row becomes blank as shown in FIG. 8 (2). When the line feed key is input again in this state, the subtitle input field 2a becomes two subtitle input fields that are the subtitle input field 2a in which the text is input and the blank subtitle input field 2b, resulting in a state wherein a blank subtitle is generated after the sentence.

Figure 19:
FIG. 19 shows an image diagram of a subtitle input unit when a subtitle data editing method is not used.

FIG. 19 shows an image diagram of the subtitle input unit when the subtitle data editing method is not used. As shown in FIG. 19, when the subtitle data editing method of the present invention is not used, even if the line feed key is input twice in the subtitle input field 2a, a blank line is generated only in the same subtitle input field 2a and the subtitle input field is not divided. However, as shown in FIG. 1, when a plurality of performers (6a, 6b) are projected and talking in a moving image, it is necessary to switch the subtitles for each speaker, and the subtitle input field is frequently divided. Therefore, it can be said that there is an extremely high need for a method that can easily divide the subtitle input field. In that respect, it can be said that the subtitle data editing method of Embodiment 1 is an editing method having excellent operability because the subtitle input field can be easily divided by inputting the line feed key twice as described above.

Embodiment 2

Figure 9:
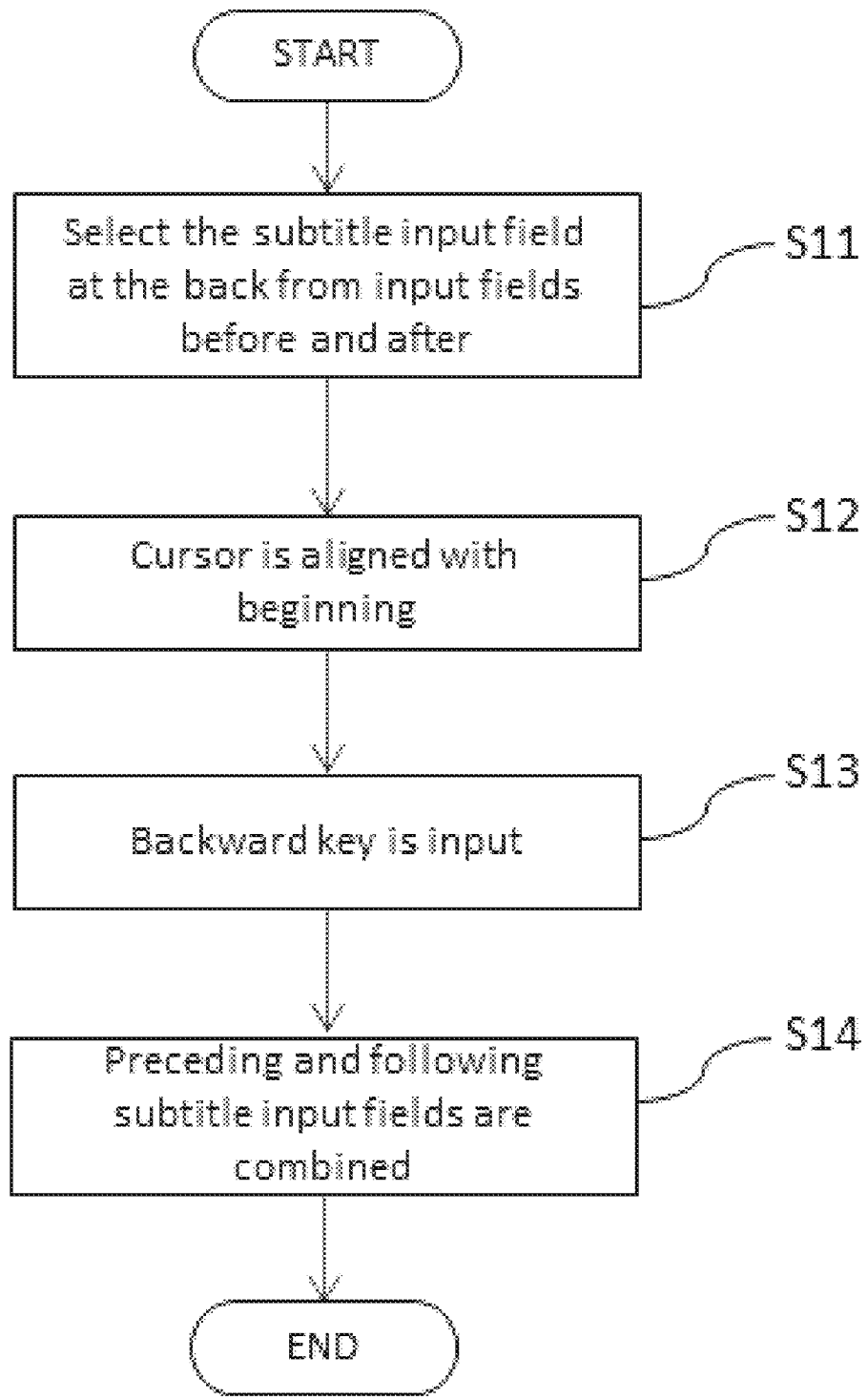
FIG. 9 shows a combining flow diagram of a subtitle input field of Embodiment 2.

In Embodiment 2, a method of combining the subtitle input fields is described. FIG. 9 shows a combining flow diagram of the subtitle input field of Embodiment 2. Further, FIG. 10 is a combined image diagram of the subtitle input field, where (1) shows before combining and (2) shows after combining.

As shown in FIG. 10 (1), before combining, the subtitle input field 2a contains "Hello", and the subtitle input field 2b contains "It's good weather today." When there are subtitle input fields before and after in this way, it is possible to combine the subtitle input fields with a simple operation. Specifically, as shown in FIG. 9, the subtitle input field 2b at the back is selected from the subtitle input fields before 2a and after 2b (step S11). Next, the cursor 7 is aligned with the beginning of the subtitle input field 2b (step S12). In this state, the backward key (backspace key) is input (step S13). As a result, the preceding and the following subtitle input fields (2a, 2b) are combined, and as shown in FIG. 10 (2), only the subtitle input field 2a is provided (step S14). In step S13, a dialog may be displayed asking for confirmation as to whether or not to combine the subtitle input fields after inputting the backward key. Further, in this Embodiment, the backward key is input as a combination operation, but it may be input by other key input such as a delete key, or may be input by a mouse or voice.

In Embodiment 1, the method of dividing the subtitle input fields has been described, but not only the dividing but also the combining of subtitle input fields can be easily performed in this way, so that the subtitle input field can be combined when it is erroneously divided. Convenience is improved because it can be divided when they are erroneously combined.

Note that the handling of the subtitle display time when the subtitle input fields are combined will differ depending on whether or not the subtitle display time is set. Namely, when combining the subtitle input field in which the subtitle display time is set and the subtitle input field in which the subtitle display time is not set, the subtitle input in which the subtitle display time is set is applied as it is. On the other hand, if the subtitle input fields to be combined are all subtitle input fields for which the subtitle display time has been set, the subtitle display starting time of the previous subtitle input field and the subtitle display ending time of the subsequent subtitle input field are applied. Further, when the subtitle input fields to be combined are the subtitle input fields in which the subtitle display time has not been set, the subtitle display time remains unset.

Embodiment 3

Figure 11:
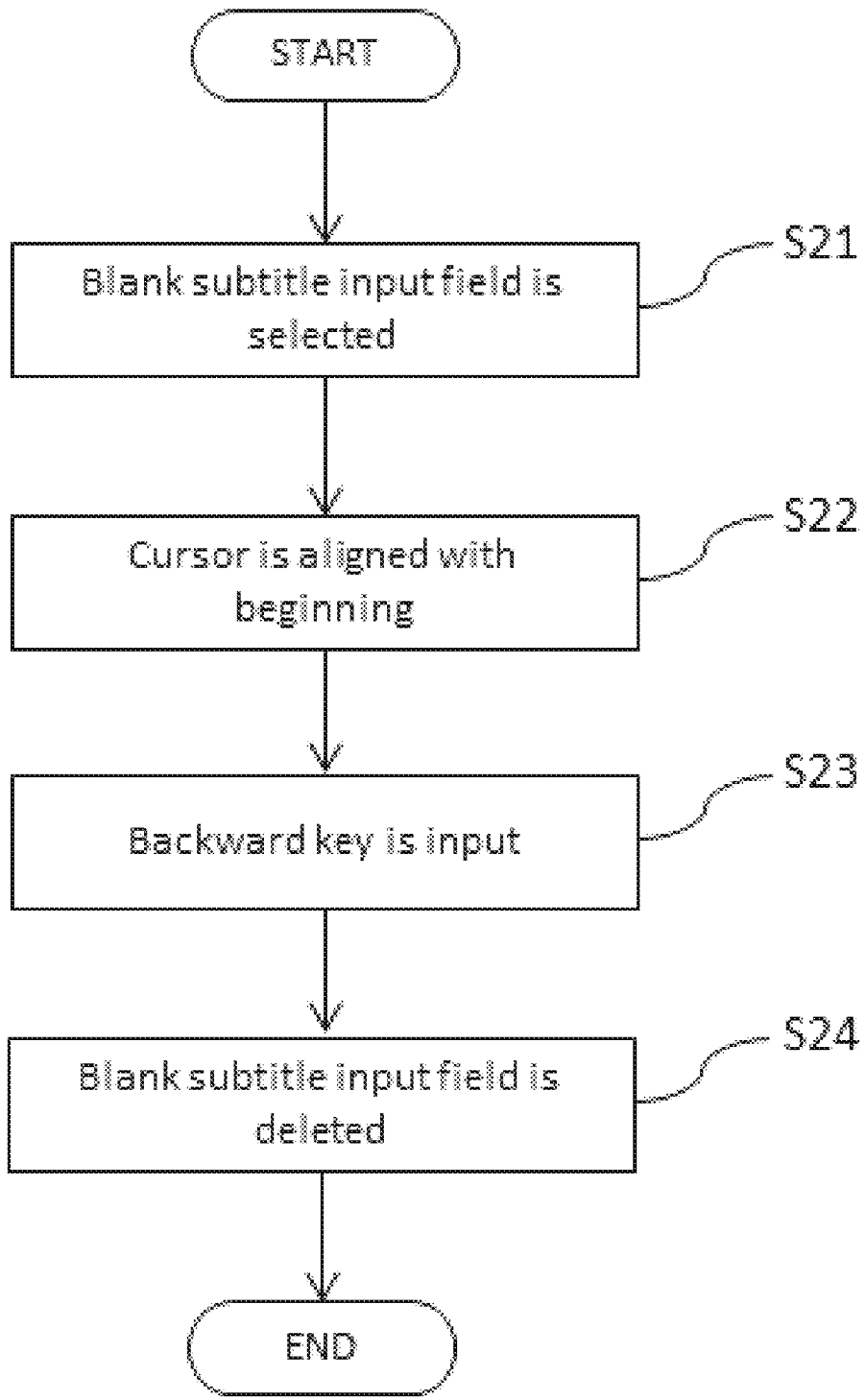
FIG. 11 shows a deletion flow diagram of a subtitle input field of Embodiment 3.

In Embodiment 3, a method of deleting the subtitle input field will be described. FIG. 11 shows a deletion flow diagram of the subtitle input field of Embodiment 3. Further, FIG. 12 is a deletion image diagram of a blank subtitle input field, with (1) showing before the deletion and (2) after the deletion. As shown in FIG. 12 (1), before deletion, "It's good weather Hello today" is input in the subtitle input field 2a, although the subtitle input field 2c are input as "Well", subtitle input field 2b is blank.

As described above, when the blank subtitle input field exists and the blank subtitle input field is unnecessary, the subtitle input field can be deleted by a simple operation. Specifically, as shown in FIG. 11, a blank subtitle input field 2b is selected (step S21). Next, the cursor 7 is aligned with the beginning of the subtitle input field 2b (step S22). In this state, the backward key (backspace key) is input (step S23). As a result, the blank subtitle input field 2b shown in FIG. 12 (1) is deleted (step S24). As a method of deleting the blank subtitle input field 2b in the state shown in FIG. 12 (1), the cursor 7 may be aligned with the beginning of the subtitle input field 2c and the backward key may be input.

Since the subtitle input field can be easily deleted in this way, the subtitle data editing method becomes more convenient. In addition, even if the subtitle input field is not blank and a sentence is input, the subtitle input field can be easily deleted by deleting the sentence in advance and then using the deletion method in this embodiment. In step S23, a dialog may be displayed asking for confirmation as to whether or not to delete the subtitle input field after inputting the backward key. Further, although the backward key is input as the deletion operation in this embodiment, it may be input by other key input such as the delete key, or may be input by a mouse or voice.

Embodiment 4

As shown in FIG. 1, the operation screen 1 is provided with a moving image display unit 3, and the moving image display unit 3 is provided with a play/stop button 3a. When the play/stop button 3a is clicked, the moving image to be edited is played on the moving image display unit 3. Then, in the subtitle data editing method of Embodiment 4, it is possible to set when to display the subtitles while playing the moving image in accordance with the playing of the moving image.

Figure 13:
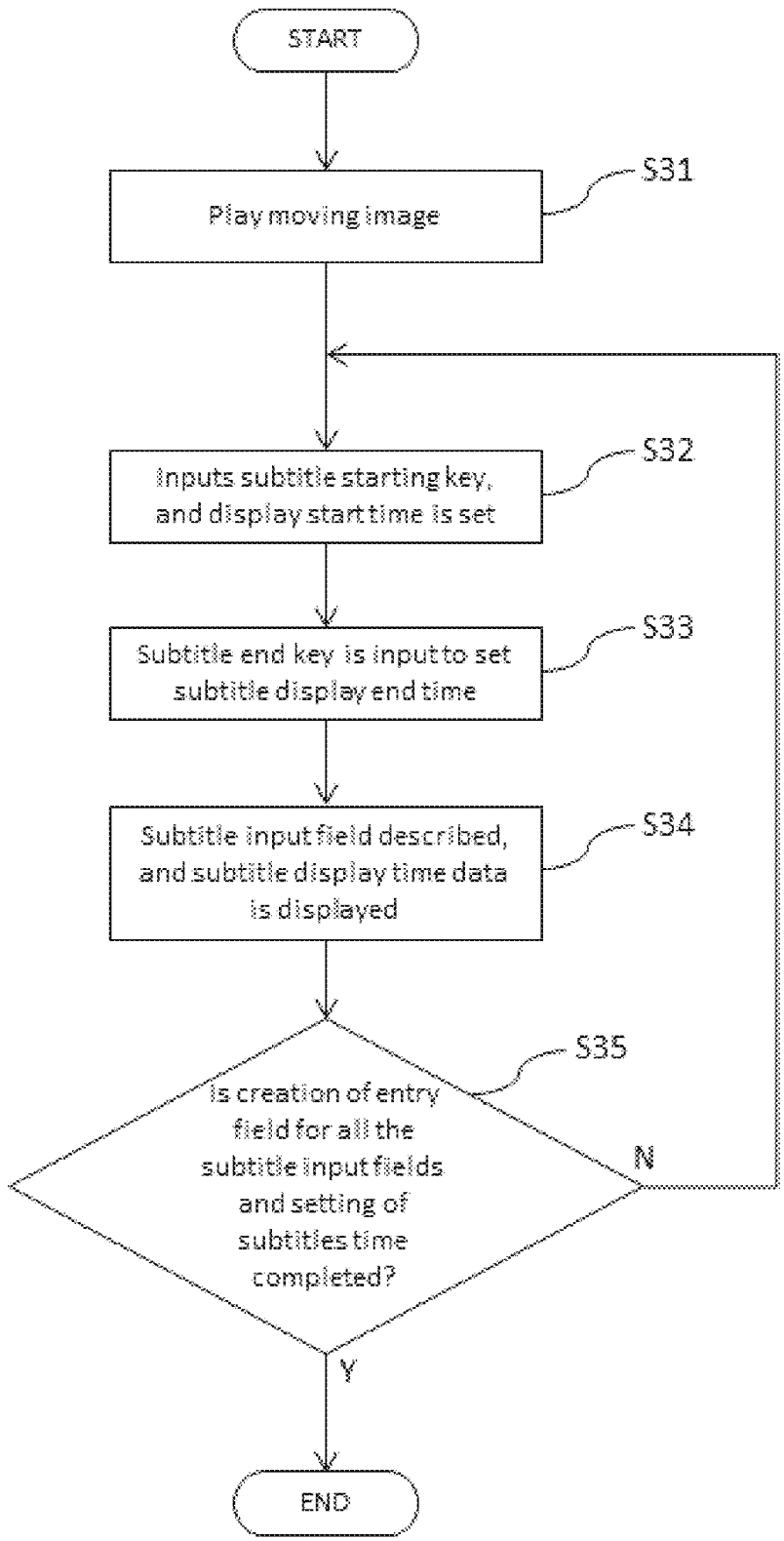
FIG. 13 shows a schematic flow diagram of a subtitle data editing method of Embodiment 4.

FIG. 13 shows a schematic flow diagram of the subtitle data editing method of Embodiment 4. Further, FIG. 14 is an image diagram of the audio waveform display unit and the subtitle time setting unit, FIG. 14 (1) is when the subtitle display start time is set, (2) is when the subtitle display end time is set, and (3) is after setting of the subtitle time.

As shown in FIG. 13, first, the play/stop button 3a is clicked to play the moving image to be edited on the moving image display unit 3 (step S31). As shown in FIG. 14 (1), when the moving image is played back, the voice waveform display unit 4 displays the voice waveform 4a flowing from right to left in accordance with the playing back of the moving image. The playback time point display unit 8 represents the playback time point of the moving image displayed on the moving image display unit 3.

The user inputs the subtitle starting key (not shown) at the timing when he/she wants to display the subtitle while watching the video, using the content of the video being played and the audio waveform 4a as a clue, and the display start time is set (step S32). In this embodiment, as shown in FIG. 14 (1), the subtitle display start time is set by inputting the subtitle start key at the timing when the time $T_1$ reaches the playback time point display unit 8.

Next, at the timing when it is desired to end the display of the subtitle, the subtitle end key (not shown) is input to set the subtitle display end time (step S33). In this embodiment, as shown in FIG. 14 (2), the subtitle display end time is set by inputting the subtitle end key at the timing when the time $T_2$ reaches the reproduction time point display unit 8. As a result, the subtitle input field described later is generated, and at the same time, the subtitle time setting for the subtitle input field is completed. Visually, as shown in FIG. 14 (3), the subtitle display time data 5a indicating the subtitle display range is displayed (step S34).

Figure 15:
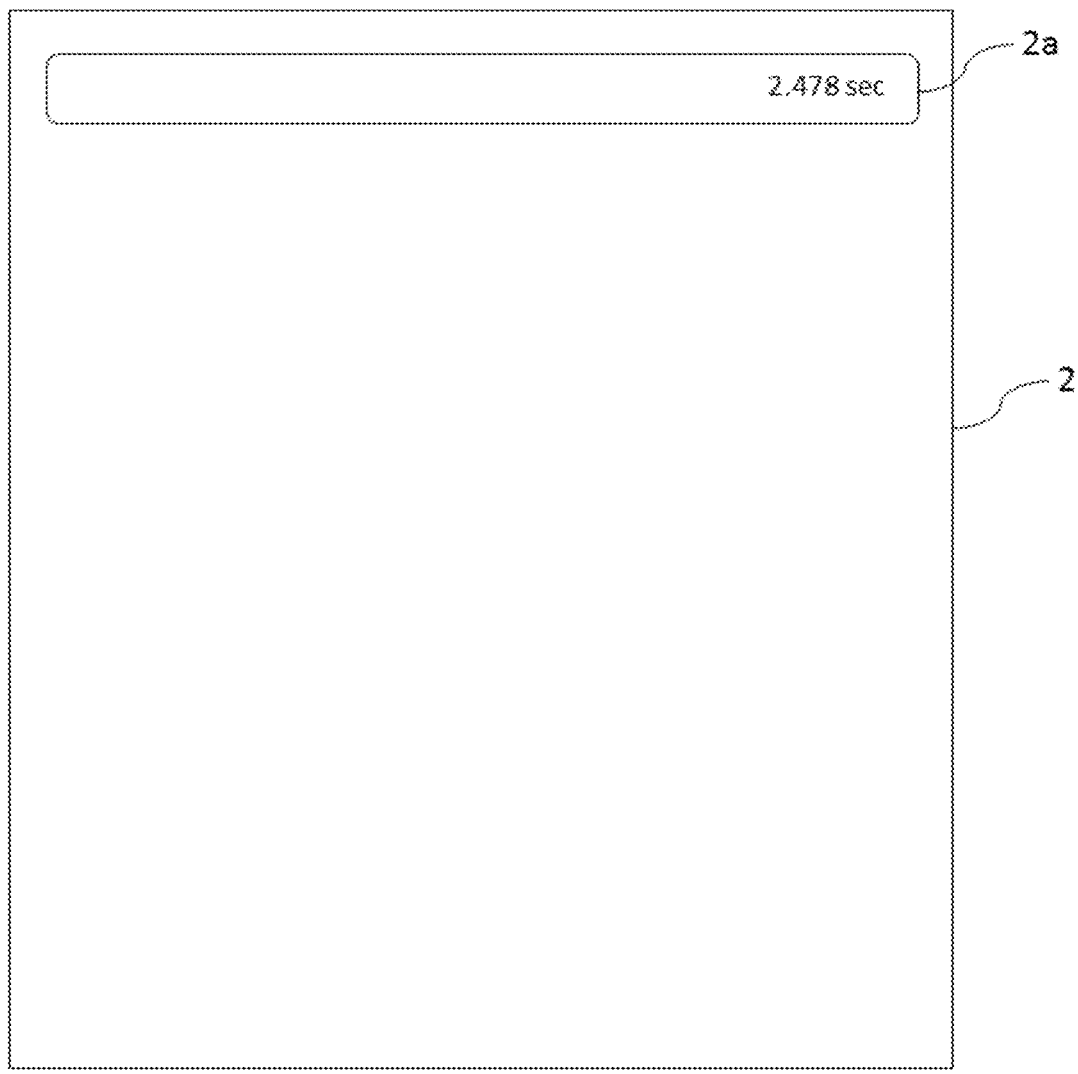
FIG. 15 shows an image diagram of a subtitle input unit of Embodiment 4.

FIG. 15 is an image diagram of the subtitle input unit of Embodiment 4, and shows a case where one subtitle input field is generated. When the subtitle start key is input and then the subtitle end key is input, the subtitle input field 2a is generated as shown in FIG. 15. At the right end of the subtitle input field 2a, 2.478 seconds is displayed as the subtitle display time for displaying the text input in the subtitle input field on the moving image.

If the creation of all the subtitle input fields and the setting of the subtitle time in the moving image are not completed (step S35), the subtitle display start time is set again (step S32) and the subtitle display end time is set (step S33). In this way, you can create the subtitle input field and set the subtitle time at the same time by simply inputting the subtitle start key and subtitle end key alternately while playing the video image, so you only need to play the video once to be able to easily create the subtitle input field and set the subtitle display time. Note that it is preferable that the playback speed of the moving image can be adjusted arbitrarily.

Figure 16:
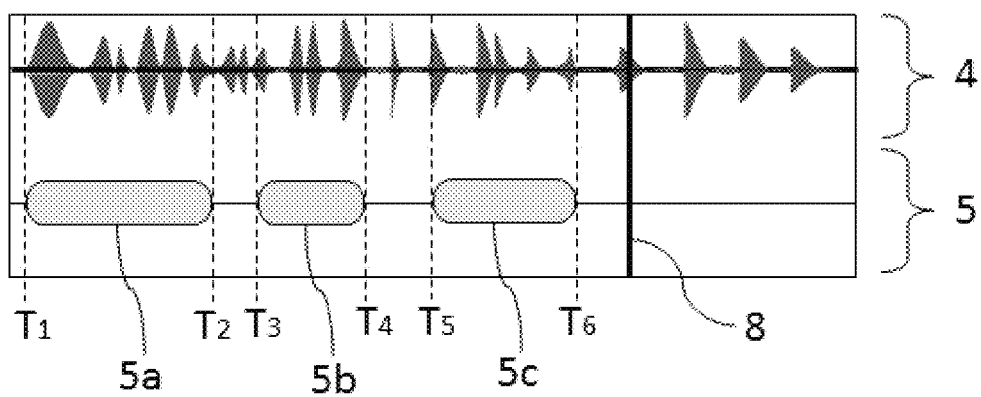
FIG. 16 shows an image diagram of an audio waveform display unit and a subtitle time setting unit.

FIG. 16 is an image diagram of the audio waveform display unit and the subtitle time setting unit, and shows a case where a plurality of subtitle display time data is displayed. Further, FIG. 17 is an image diagram of the subtitle input unit of the fourth embodiment, and shows a case where a plurality of subtitle input fields are generated.

As shown in FIG. 16, in the subtitle display time data 5a, the time $T_1$ is the subtitle display start time and the time $T_2$ is the subtitle display end time. In the subtitle display time data 5b, the time $T_3$ is the subtitle display start time and the time $T_4$ is the subtitle display end time. Further, in the subtitle display time data 5c, the time $T_5$ is the subtitle display start time and the time $T_6$ is the subtitle display end time.

Figure 17:
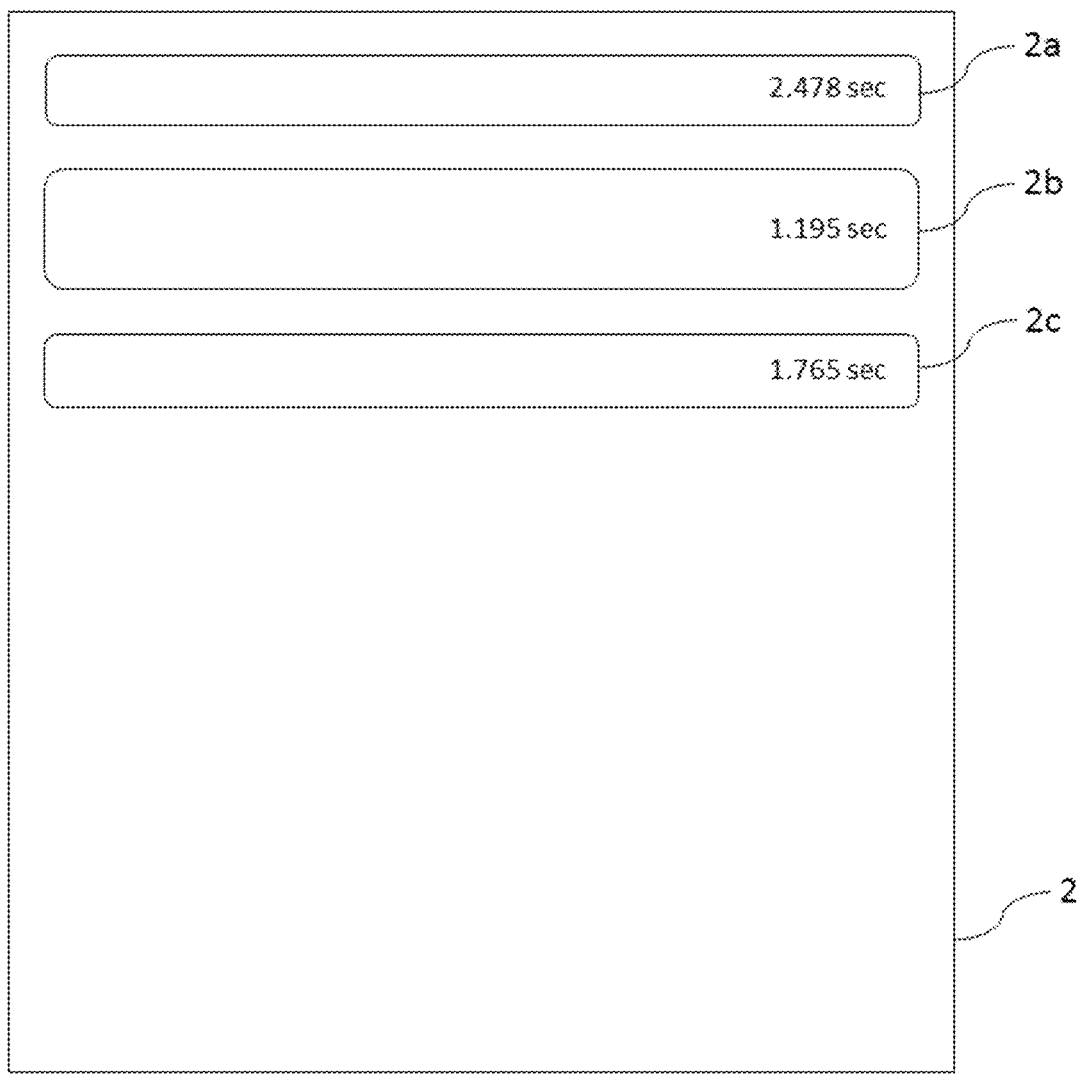
FIG. 17 shows an image diagram of a subtitle input unit of Embodiment 4.

As shown in FIG. 17, at the right end of the subtitle input fields (2a~2c), the subtitle display time for displaying the text input in each subtitle input field on the moving image is displayed. Specifically, the subtitle input field 2a is displayed 2.478 seconds, the subtitle input field 2b is displayed for 1.195 seconds, and the subtitle input field 2c is displayed for 1.765 seconds. As described above, in this Embodiment, the text input to the subtitle input field is not performed one by one, but the creation of each subtitle input field and the setting of the subtitle time are prioritized. Therefore, no text has been entered in the subtitle input fields (2a~2c) yet.

The subtitle display time data (5a~5c) shown in FIG. 16 correspond to the subtitle input fields (2a~2c) shown in FIG. 17, respectively. Therefore, in the case of the subtitle display time data 5a, the creation of the subtitle display time data 5a is started by inputting the subtitle start key at the time $T_1$, and the subtitle display time is input by inputting the subtitle end key at the time $T_2$. The creation of the data 5a is completed, and the data 5a is displayed as the subtitle display time data 5a shown in FIG. 16. Further, at the time $T_2$, the subtitle input field 2a shown in FIG. 17 is automatically generated at the timing when the subtitle end key is input.

Similarly, in the case of the subtitle display time data 5b, the creation of the subtitle display time data 5b is started by inputting the subtitle start key at the time $T_3$, and by inputting the subtitle end key at the time $T_4$, the creation of the subtitle display time data 5b is completed, and result in display of the subtitle display time data 5b as shown in FIG. 16. Then, at the time $T_4$, the subtitle input field 2b shown in FIG. 17 is automatically generated at the timing when the subtitle end key is input.

Further, in the case of the subtitle display time data 5c, the creation of the subtitle display time data 5c is started by inputting the subtitle start key at the time $T_5$, and the subtitle display is performed by inputting the subtitle end key at the time $T_6$. The creation of the time data 5c is completed, and the subtitle display time data 5c shown in FIG. 16 is displayed. Then, at the time $T_6$, the subtitle input field 2c shown in FIG. 17 is automatically generated at the timing when the subtitle end key is input.

In this way, by simply inputting the subtitle start key and the subtitle end key alternately, the subtitle input fields (2a~2c) can be created and the start and end times of the subtitle display can be set at the same time. It has a configuration that enables complicated editing with simple operations.

Note that keyboard shortcut keys located close to each other are assigned to the subtitle start key and the subtitle end key in this Embodiment. Specifically, the "Command (shift)+D" is assigned as the subtitle start key, and the "Command (shift)+F" is assigned as the subtitle end key. Unlike this, the shortcut key may be located at a remote position, or may be input by a mouse or voice.

Embodiment 5

FIG. 18 shows an image diagram of moving the cursor in the subtitle input field. As shown in FIG. 18 (1) or 18 (2), subtitle input fields (2a~2d) are created in the subtitle input unit 2, and text is input to the subtitle input fields (2a to 2c), respectively.

In FIG. 18 (1), the cursor 7 is placed at the beginning of the lower row of the subtitle input field 2b. In this state, when the down arrow key (not shown) of the keyboard is input once, the cursor 7 moves to the beginning of the subtitle input field 2c as shown in FIG. 18 (2). On the contrary, as shown in FIG. 18 (2), when the cursor 7 is placed at the beginning of the subtitle input field 2c and the upward arrow key (not shown) of the keyboard is input once, as shown in FIG. 18 (1), the cursor 7 moves to the beginning of the lower row of the subtitle input field 2b.

In this way, the subtitle input fields (2a~2d) are used for subtitle display as separate input fields, but during editing work, the cursor can be freely moved by inputting the up/down/left/right direction keys. As a result, the direction keys can be continuously input or the input state can be maintained without changing the selection state of the subtitle input field (2a to 2d) by inputting the so-called tab key or the like. The cursor can be easily moved, and it is a highly convenient way. In this embodiment, the direction key is input as the direction input operation, but other key input may be used, or input by mouse or voice may be used.

Other Embodiments

Different shortcut keys may be assigned each to the subtitle data editing methods described in the embodiments 1 to 5.

INDUSTRIAL APPLICABILITY

The present invention is useful as a method for editing video contents.

DESCRIPTION OF SYMBOLS

1 Operation screen
2 Subtitle input unit
2a~2f Subtitle input field
3 Moving image display unit
4 Audio waveform display unit
4a Audio waveform
5 Subtitle time setting unit
5a, 5b Subtitle display time data
6a, 6b Performer
7 Cursor
8 Playback time point display unit
T Time

The invention claimed is:

1. A subtitle data editing method performed by a computer, the method comprising at least one of the following executions:
a dividing execution which includes the computer accepting a predetermined line feed operation twice consecutively in a state wherein a cursor is present in a subtitle input field, the computer then separating the subtitle input field at the cursor into a first subtitle input field and a second subtitle input field, and the computer displaying the two subtitle input fields on a screen with the cursor;
a combining execution which includes the computer accepting a predetermined combination operation in a state wherein a cursor is present at a beginning of a second subtitle input field, the computer then combining the second subtitle input field with a first subtitle input field which precedes the second subtitle input field thereby forming a combined subtitle input field, and the computer displaying the combined subtitle input field on a screen with the cursor;
a first deleting execution which includes the computer accepting a predetermined deletion operation in a state wherein a cursor is present at a beginning of a blank subtitle input field which follows a first subtitle input field, the blank subtitle input field having no subtitle content to display, the computer then deleting the blank subtitle input field, and the computer displaying the cursor on a screen in the first subtitle input field without displaying the deleted blank subtitle input field; or
a second deleting execution which includes the computer accepting a predetermined deletion operation in a state wherein a cursor is present at an end of a first subtitle input field which is followed by a blank subtitle input field, the computer then deleting the blank subtitle input field, and the computer displaying the cursor on a screen in the first subtitle input field without displaying the deleted blank subtitle input field.

2. The method of claim 1, wherein the computer performs the dividing execution and wherein prior to accepting the predetermined line feed operation twice consecutively a subtitle content is located in the subtitle input field and the cursor is between a first portion of the subtitle content and a second portion of the subtitle content, and after the separating the first portion of the subtitle content is displayed in the first subtitle input field and the second portion of the subtitle content is displayed in the second subtitle input field.

3. The method of claim 1, wherein the computer performs the dividing execution and wherein prior to accepting the predetermined line feed operation twice consecutively a subtitle content is located in the subtitle input field and the cursor is before the subtitle content, and after the separating the first subtitle input field is displayed as blank in that it has no subtitle content to display, and the subtitle content is displayed in the second subtitle input field.

4. The method of claim 1, wherein the computer performs the dividing execution and wherein accepting the predetermined line feed operation twice consecutively comprises accepting input from a line feed key or a return key.

5. The method of claim 1, further comprising the computer setting a subtitle display start time and a subtitle display end time, thereby specifying a display time period for a subtitle input field.

6. The method of claim 5, wherein setting the subtitle display start time or setting the subtitle display end time or both includes receiving a keyboard shortcut key input.

7. The method of claim 5, wherein the computer specifies the display time period for a subtitle input field when the subtitle input field is blank of subtitle content to display during the display time period.

8. The method of claim 5, comprising the computer specifying respective subtitle display times for each of a plurality of subtitle input fields which are each blank of subtitle content to display.

9. The method of claim 1, further comprising the computer moving the cursor from one subtitle input field to another subtitle input field after accepting a predetermined direction input operation.

10. The method of claim 1, further comprising the computer playing a moving image, and wherein at least one of the dividing execution, the combining execution, the first deleting execution, or the second deleting execution are performed during the playing.

11. The method of claim 1, wherein the method further comprises the computer playing a moving image, and wherein the dividing execution is performed, thereby editing subtitle content displayed with the moving image.

12. The method of claim 1, wherein the method further comprises the computer playing a moving image, and wherein the combining execution is performed, thereby editing subtitle content displayed with the moving image.

13. The method of claim 1, wherein the method further comprises the computer playing a moving image, and wherein the first deleting execution is performed, thereby editing subtitle content displayed with the moving image.

14. The method of claim 1, wherein the method further comprises the computer playing a moving image, and wherein the second deleting execution is performed, thereby editing subtitle content displayed with the moving image.

15. The method of claim 1, wherein the method further comprises the computer playing a moving image, and wherein the moving image includes at least one of the following: a movie content, a television content, or a content in which still images are switched.

\* \* \* \* \*